United States Patent [19]

Montes

[11] Patent Number: 5,237,353
[45] Date of Patent: Aug. 17, 1993

[54] PROCESS FOR THREE-DIMENSIONAL TAKING, COPYING AND REPRODUCING OF STILL AND MOVING PICTURES

[76] Inventor: Juan D. Montes, Urbanización Las Cabanas II, Chalet No. 9, Madrid, Spain

[21] Appl. No.: 691,006
[22] PCT Filed: Jul. 12, 1990
[86] PCT No.: PCT/ES90/00024
§ 371 Date: Jun. 19, 1991
§ 102(e) Date: Jun. 19, 1991
[87] PCT Pub. No.: WO92/01241
PCT Pub. Date: Jan. 23, 1992

[51] Int. Cl.⁵ .................................................. G03B 19/18
[52] U.S. Cl. ...................................... 352/53; 352/58; 352/59; 352/65; 352/81
[58] Field of Search ....................... 352/58, 59, 81, 65, 352/53

[56] References Cited

U.S. PATENT DOCUMENTS

| | | | |
|---|---|---|---|
| 2,868,065 | 1/1959 | Tondreau | 352/59 |
| 3,225,651 | 12/1965 | Clay | 352/59 |
| 3,482,913 | 12/1969 | Glenn | 352/59 |
| 3,657,981 | 4/1972 | Beton . | |
| 4,327,980 | 5/1982 | Godin . | |
| 4,650,305 | 3/1987 | Hines | 352/59 |
| 4,751,570 | 6/1988 | Robinson | 352/65 |
| 4,957,361 | 9/1990 | Shaw | 352/59 |

FOREIGN PATENT DOCUMENTS

439449 6/1912 France .
2103822 4/1972 France .
181585 3/1936 Switzerland .

Primary Examiner—Monroe H. Hayes
Attorney, Agent, or Firm—Ladas & Parry

[57] ABSTRACT

Integrated process for three-dimensional taking, copying and reproducing of still and moving pictures, in which (a) the taking of still or moving three-dimensional pictures is done using conventional cameras which expose as many two-dimensional pictures as there are cameras, there are n cameras which are distributed in groups or supergroups, there being inserted between each two horizontal camera groups which have their optical axes mutually perpendicular a semi-transparent plate forming 45° with the groups, the optical axis of a camera remaining situated in such a way that its projection remains at the mid-point between optical axes of two adjacent cameras of the other conjugated group; the undesired rays are suppressed using a completely black plate; (b) in order to copy the n pictures taken, the latter are grouped together in trios, the left and right pictures being copied in a specularly inverted state with respect to the central picture, each one of the trios being situated at a different projection height; (c) the projection is performed using n/3 projection lenses, adjusting these lenses in such a way that the central picture of the film is reproduced directly onto the transparent reproduction screen or through a front reflection by a reflecting mirror situated in front of the lenses; the lateral pictures being projected via reflections in systems of lateral mirrors; and each one of the n/3 projection lenses is situated offset in height with respect to the adjacent lenses.

1 Claim, 8 Drawing Sheets

PROCESS FOR THREE-DIMENSIONAL TAKING, COPYING AND REPRODUCING OF STILL AND MOVING PICTURES

FIELD OF THE INVENTION

The present application relates to a process and to an optical system which are integrated and in which three-dimensional still or moving pictures are taken, the films coming from the different cameras are copies onto a single film of modest length, and this latter film is reproduced, furnishing new three-dimensional or moving pictures. The invention encompasses cinematographic systems, still signs, slides and video, including television, principally for domestic use, in shop windows, conference rooms and other similar places for exhibition.

The Applicant is the holder of the Spanish Patent of Invention with Publication No. 2,000,293 (Application Number 8,603,612), of the Spanish Patent of Invention with Publication Number 20,135,269 (Application Number 8,902,155), and of the Spanish Patent Application being processed 8,900,722 filed on Feb. 28, 1989. Likewise, the Applicant has filed the Patent Applications PCT/ES 90/00013 and 90/00014, both being processed, as well as other applications corresponding to the Spanish ones, in various countries and at the European Patent Office.

In these patents and patent applications there are described and claimed various aspects of optical systems for achieving three-dimensional reproductions, based on the angular differentiation of pictures. Specifically, in the Spanish Patent 20,135,269 as well as in the Application PCT 90/00013, there is described an improved screen capable of being used in the optical systems in question, and also a process for manufacturing said improved screen.

BACKGROUND OF THE INVENTION

Systems based on the angular differentiation of pictures require the taking of a large number of pictures from different places and the projecting of the same number of pictures from different locations.

From the literature which deals with the taking of three-dimensional pictures, it is known that the maximum separation between the optical centres of the taking lenses for the reproduction to appear continuous is a function of the distance between the nearest object and the furthest object (depth of field) as well as of the distance between these objects with respect to the picture-taking device.

In order to apply these theoretical results in practice, in many cases of the prior art a separation is achieved between the optical centres of the taking lenses which is less than the breadth of the common, marketed or conventional cameras.

If the picture to be taken were to remain motionless, then it would be possible to do the taking with a conventional camera situated in a different place at each instant. However, if the picture were moving, this system would be inappropriate.

As far as the Applicant knows, there exist on the market very few cameras which can fulfill the conditions required for taking pictures. Those which are known have several lenses of small diameter and a likewise reduced negative format. These cameras are generally designed for their use in photography, and are used for reproducing still pictures in most cases as photographs on paper. A very small number of pictures, usually four, is used, which is entirely insufficient for systems based on the angular differentiation of pictures, and for this reason cannot be used in the present case.

Because of this lack of suitable cameras for taking three-dimensional pictures, it is necessary to take a large number of two-dimensional pictures, each one with a conventional camera; correspondingly, the same large number of projectors or projection lenses would be needed to reproduce the pictures taken three-dimensionally.

In the Ives U.S. Pat. No. 1,833,290, there are described three systems of reproduction by projection which are appropriate for still or moving pictures.

Of these three systems, that of back-projection is suitable only for systems based on the scalar differentiation of pictures, and therefore cannot be considered in the present case.

On the other hand, the other two systems, both of which are front-projection systems, can be employed for the angular differentiation of pictures.

In the first of these systems as many projectors and films are used as there are pictures.

The second system employs a single film in only one projector with as many lenses as pictures taken, the latter being mutually separated by the same distance as would occur if individual projectors were involved.

The disadvantage of both systems arises from the large volume occupied by the reproduction part of the system, as well as from the enormous length of the film and of the projector or projectors when the number of pictures is high.

SUMMARY OF THE INVENTION

In view of the above, and in his desire to obtain maximum efficiency from his optical systems for three-dimensional reproduction, those which are dealt with profusely in the applications and patents mentioned earlier at the beginning of this document, the Applicant has developed a process and an optical system, which are integrated, for taking, copying and reproducing three-dimensional pictures.

As has already been explained, present optical systems for three-dimensional pictures are based on the angular differentiation of these pictures.

Systems based on the angular differentiation of pictures have to employ a large number of taken two-dimensional pictures and the same number of reproduced pictures.

For taking a large number of pictures it is advisable to direct the optical axes of the n taking lenses (cameras) towards the point which later, during reproduction, will be situated on the screen. (The number n of lenses or cameras can take several values, always multiples of 3, the value 15 being preferred.) This will avoid the lateral cameras excluding the main motif of the scene from the field. Since each picture is taken with a different lens, which also belongs to a different camera, the focusing of all the optical axes onto the same point is very easily achieved by inclining each camera by the necessary angle in the horizontal plane. This focusing can be done automatically at each moment, controlled using a mechanical system of appropriately synchronised bellows. On the other hand, since the distance between the optical centres of the lenses of the cameras must, in many cases, be less than the breadth of the latter, a tricky problem arises, which has to be resolved using special devices and processes.

The Applicant has succeeded in solving these taking problems using a process and a corresponding optical system in such a way that the cameras operate as if their optical centres were situated at a lesser mutual distance than that permitted by the breadth of the cameras, if the latter were situated intimately next to one another.

The first step of the overall process of the present invention, is aimed at taking still or moving three-dimensional pictures making use of conventional cameras which expose, on film, slide or video tape, as many two-dimensional pictures as there are cameras, these cameras being mounted in several groups, the optical centres of these cameras of each group being situated in a horizontal line and the optical centres being mutually separated by a distance D which is at least equal to the width of a camera; the horizontal lines of the groups are separated by a distance compatible with the size of each camera; two horizontal camera groups are disposed with their optical axes mutually perpendicular, forming 45° with a semitransparent plate which, through one of its surfaces, permits the subject to be observed in background by one camera group, whereas said subject is observed in reflection by the other camera group situated facing the other surface of the plate; the optical axis of a camera $X_1$ is situated in such a way that its resulting projection remains at the mid-point of the separation between optical axes of the cameras $X_{i-1}$ and $X_{i+1}$ (this artifice succeeding in optically diminishing by half the resulting adjacent-camera inter-optical axis distances); in order to suppress the light reflected by the semitransparent plate at the surface which is to behave transparently, and, conversely, the light transmitted by the surface which is to behave reflectively, a completely black plate which absorbs the undesired rays is disposed to one side of each camera; with this, n films, slides or video tapes are achieved.

As a second step of the overall process, the conjugated pictures, that is to say corresponding to the same instantaneous subject, are disposed grouped together in trios, in such a way that the left and right pictures of each trio are copies in a specularly inverted state with respect to the central picture of the same trio, each one of these trios being situated at a different projection height; in this way, the n pictures, preferably fifteen, remain on a single film; the projection to be copied can be direct onto the same film or indirect via a screen, from where another taking camera copies the picture combined from the n individual pictures; in this film, the trios are to be offset by a distance $K_R$, which is that which exists between optical centres of adjacent projection lenses.

The third step of the process consists in projecting the pictures at the place of observation, this projection being done using n/3 projection lenses, that is to say as many lenses as picture trios or taking cameras having been used; the projection is performed by adjusting the projection lenses in such a way that the central picture of the film is reproduced directly onto the reproduction screen or via a front reflection by a mirror situated in front of the lenses; the lateral pictures are projected via an additional left reflection or via an additional right reflection, using systems of lateral mirrors; each one of the n/3 projection lenses is situated with a height offset with respect to the adjacent projection lenses which is equal to the height distance which exists between the picture trios of the film; thus, when the film is advanced as a function of three pictures, each projection lens is positioned at a different height, whereas if the film is advanced at a rate of six pictures, each two lenses are positioned at the same height, different from the two following or previous projection lenses.

With this combined process a very simple and convenient reproduction is achieved of the three-dimensional pictures on a small- to intermediate-sized screen, the projector occupying a third part of the space which it would occupy if the n pictures were projected using n projection lenses situated one next to the other with the relevant height offset. If the projecting is done in a cinema, this projection artifice would become unnecessary.

Corresponding optical arrangements, which will be detailed below, have been developed in order to embody this overall process.

Thus, for the taking of pictures, the cameras are distributed into $2, 4, 8 \ldots, 2^m$ groups on a platform suitably provided with guide rails; each two camera groups, each one disposed in a common horizontal line, are positioned with mutually perpendicular optical axes, there being interposed between the groups a semitransparent plate forming 45° with the optical axes of these groups and there being disposed a black plate which forms 45° with the semitransparent plate; in the event that four camera groups are provided, these groups are distributed in two supergroups, each one formed by two camera groups with mutually perpendicular optical axes and with a set of (semitransparent and black) interposed plates, the semitransparent plate forming 45° with the optical axes and the black plate forming 45° with the latter plate; the two supergroups are disposed with their optical axes mutually perpendicular and there are interposed another set of (semitransparent and black) plates, the semitransparent plate forming 45° with the optical axes of the supergroups; the transverse cross-sectional sizes of the plates are calculated using an optical study of the combination of the camera groups, the optical axes of the individual taking cameras having to remain situated at the mid-point of each two optical axes of the adjacent cameras of the opposite group; this relationship is correspondingly repeated with the supergroups.

The arrangement for copying the films or similar corresponding elements consists of n projectors which are disposed in trios of projectors situated at the same height and mutually offset by a distance H in the direction of the height and a distance $K_R$ in the longitudinal direction; the films coming from the n taking cameras are positioned facing the respective projectors, in such a way that the left and right pictures of each trio are inverted with respect to that of the central picture; in this way, the picture trios in a film remain offset longitudinally by a distance $K_R$ and in height by a distance H.

The arrangement for three-dimensional projection of pictures consists of a projector provided with n/3 projection lenses which, via a suite of front, right lateral and left lateral mirrors, projects the pictures onto a transparent screen situated above the set of projecting lenses, the front mirror being located at half the projection distance of the lenses, this projection distance being that existing between these lenses and the virtual screen which would exist in the absence of these mirrors; with this arrangement the n/3 projection lenses are converted into three groups of n projection lenses in total, two of them virtual, on the left and on the right, the real lenses remaining in a central position; these lenses are offset longitudinally by the distance $K_R$ and in height by the distance H.

The invention will be described below with the aid of the attached drawings, in which.

Solely for the purposes of explanation it will be understood that n is equal to fifteen, or, what amounts to the same thing, fifteen cameras or taking lenses and five projection lenses are used.

Figure 1:
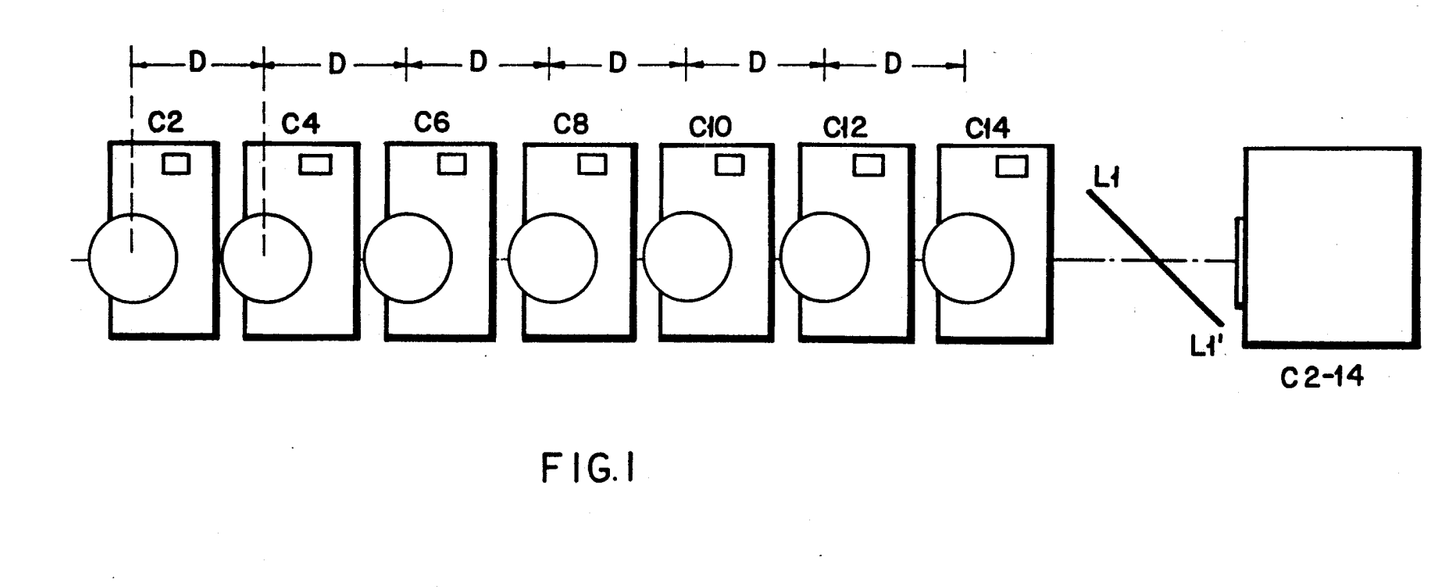
FIG. 1 represents diagrammatically the taking of pictures by a group of cameras via a semitransparent plate.

FIG. 1 represents in a diagrammatic manner how the cameras would be seen in background via a semitransparent plate. In this diagram it has been assumed that there are seven cameras disposed one next to the other in a line facing a elongated semitransparent plate positioned in a longitudinal direction forming 45° with the axes of the cameras. In the left-hand part of the figure it is observed how the taking cameras C2, C4, C6, C8, C10, C12 and C14 would be projected in the plane of the picture; the distance between optical axes of the taking cameras is D.

Figure 2:
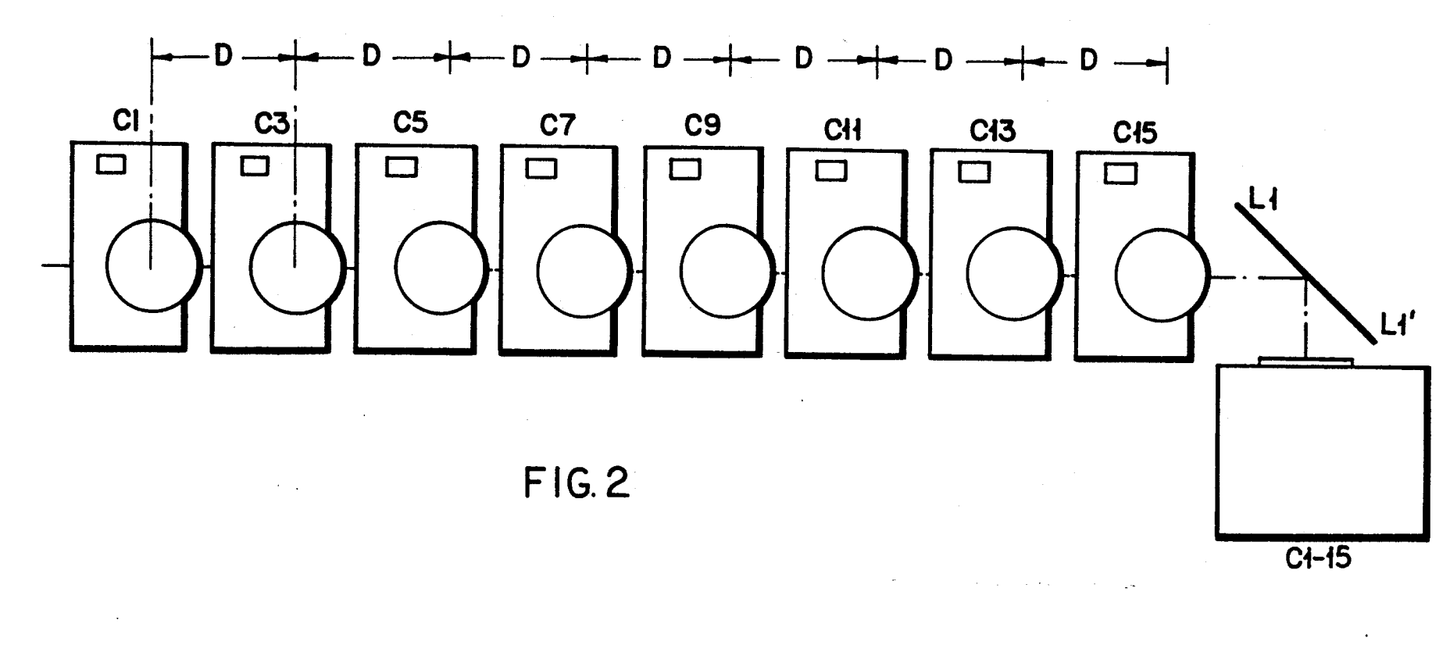
FIG. 2 represents diagrammatically the taking of pictures by a group of cameras by reflection in the semitransparent plate.

In FIG. 2 is represented in the right-hand part in side view one camera of the eight placed in file and which are situated facing a semitransparent plate positioned in a longitudinal direction forming 45° with the axes of the cameras. In the left-hand part of the figure is represented how the cameras C1, C3, C5, C7, C9, C11, C13 and C15 would be observed in reflection; likewise, the distance between optical axes of the taking cameras is D.

Figure 3:
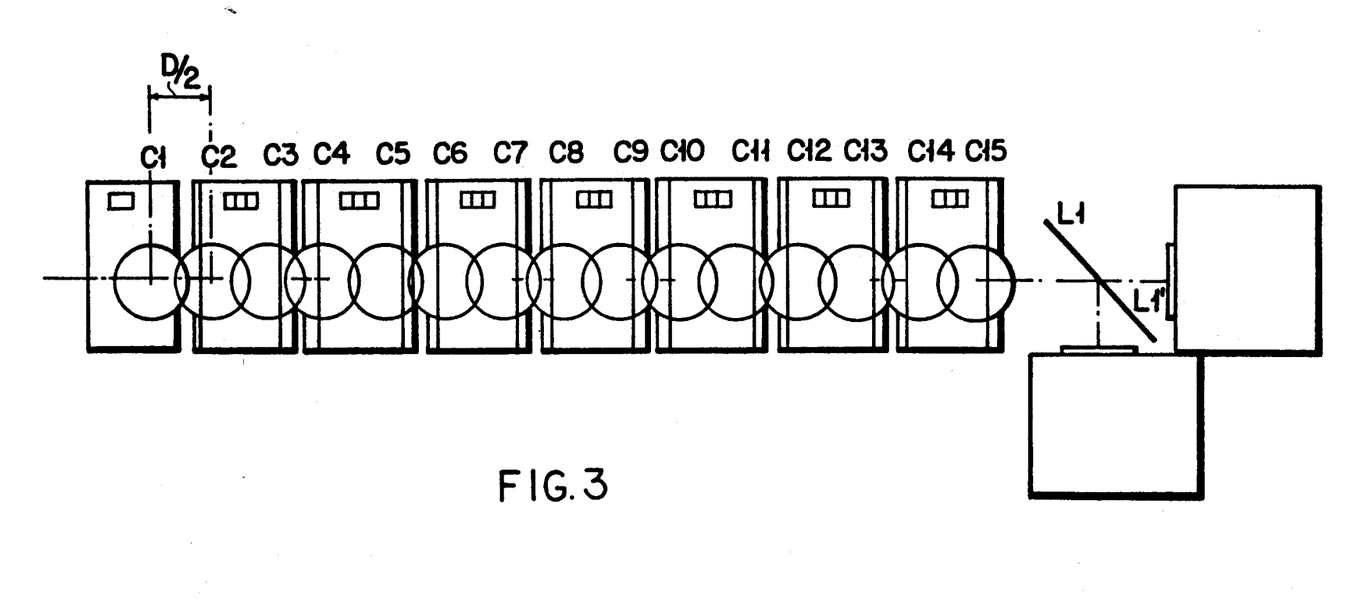
FIG. 3 represents diagrammatically the taking with the combination of two camera groups with an interposed semitransparent plate.

In FIG. 3 is represented the taking arrangement in accordance with the invention, with two camera groups represented on the right in side elevation view, each group being positioned in file in a horizontal line and having a semitransparent plate inserted between them which forms 45° with the respective optical axes.

On the left of this FIG. 3 is represented how the two camera groups would be observed in combination, some in background and others in reflection. With this, the distance between optical axes of two adjacent taking cameras remains D/2. It is clearly demonstrated with the three FIGS. 1 to 3, and in particular with this FIG. 3, that with the artifice developed by the present invention the cameras can be successfully brought optically closer to one another than a distance less than the breadth of each one of them.

Figure 4:
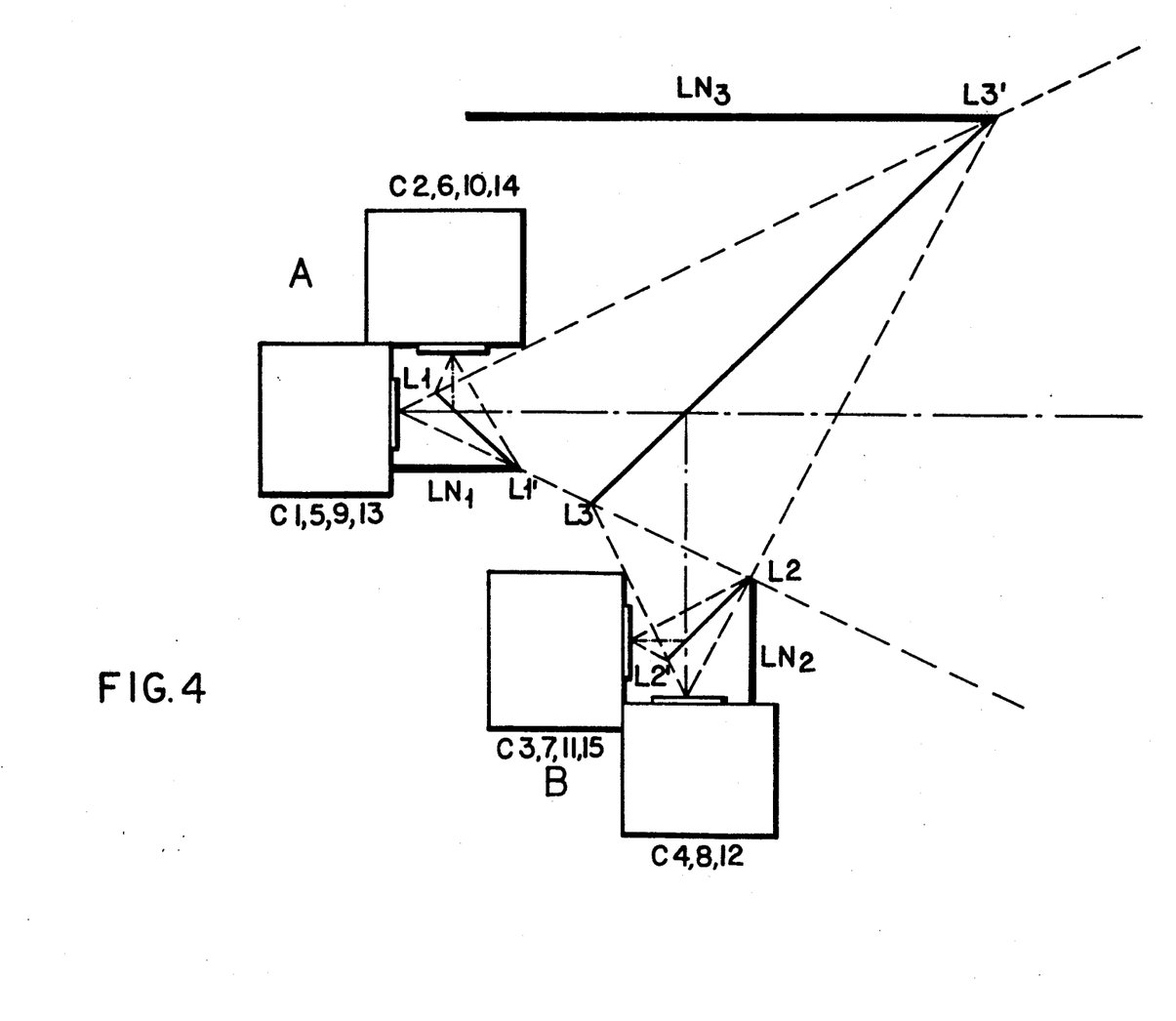
FIG. 4 represents an arrangement of taking cameras distributed in four groups, with the appropriate number of interposed semitransparent plates.

As represented in FIG. 4, in order to be able to bring the cameras even closer optically, these cameras have been subdivided into four groups, distributed in two supergroups each composed of two camera groups with mutually perpendicular optical axes and an interposed plate, L1—L1' or L2—L2', combined with a corresponding black plate LN1 or LN2, which absorbs the undesired rays. Thus, the supergroup A is composed of the group of cameras C1, C5, C9, C13 disposed in horizontal file facing the transparent surface of the plate L1—L1', and is forming 45° with the optical axes of the cameras in question; the four cameras C2, C6, C10, C14 are disposed in horizontal file facing the other, reflecting, surface of the plate L1—L1'. Perpendicular relative to this subgroup A of cameras is disposed the subgroup B of cameras which consists of a horizontal group of cameras C3, C7, C11 and C15 disposed facing the reflecting surface of a plate L2—L2', placed at 45° with respect to the optical axes of these latter cameras; the black plate LN2 is situated at 45° next to the transparent surface of this plate. The cameras C4, C8, C12 are situated facing the transparent surface of the plate L2—L2' and disposed in a horizontal line. With the purpose of succeeding in the optical distance in the picture plane of the cameras remaining reduced to D/4, each one of the supergroups A and B is regarded as being simple camera groups, these supergroups being disposed with mutually perpendicular optical axes; a plate L3—L3' is inserted between them, and, the transparent surface of this plate L3—L3' forming 45°, there is located the black plate LN3. In this figure is represented as an optical diagram the distribution of the central and extreme rays from the optical centres of the taking cameras. With this artifice, the distance between optical axes of the cameras situated in each horizontal group is successfully divided by 4. It is clear that, by repeating this arrangement, this distance could be divided consecutively by 2.

Figure 5:
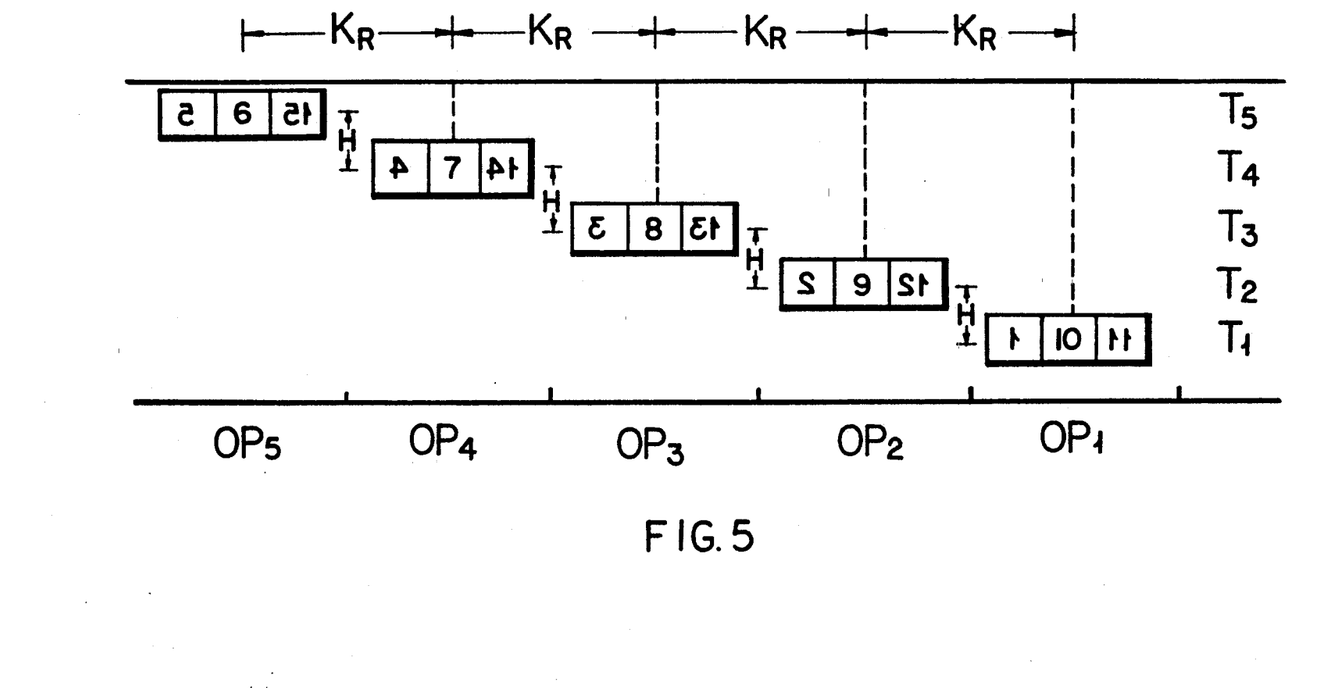
FIG. 5 represents how the picture trios copied according to the invention remain longitudinally distributed on a film.

In FIG. 5 is diagrammatically represented how fifteen pictures are combined, coming from the taking cameras C1 to C15, distributed in five picture trios which have been reproduced by projecting the lateral pictures 1-5 and 11-15 in an inverted position with respect to the central pictures 6 to 10. This inversion has been represented in the figure by inverting the picture reference numbers. Also represented in this figure is how the five projection lenses OP1, OP2, OP3, OP4 and OP5 are arranged, as well as the longitudinal distribution on a film of the five picture trios with optical axes mutually offset by the distance $K_R$ which is the distance existing between adjacent projection lenses, whereas there is a height distance H between each trio of pictures of the film. This height distance is the same as that which the adjacent projection lenses maintain between themselves in height.

Figure 6:
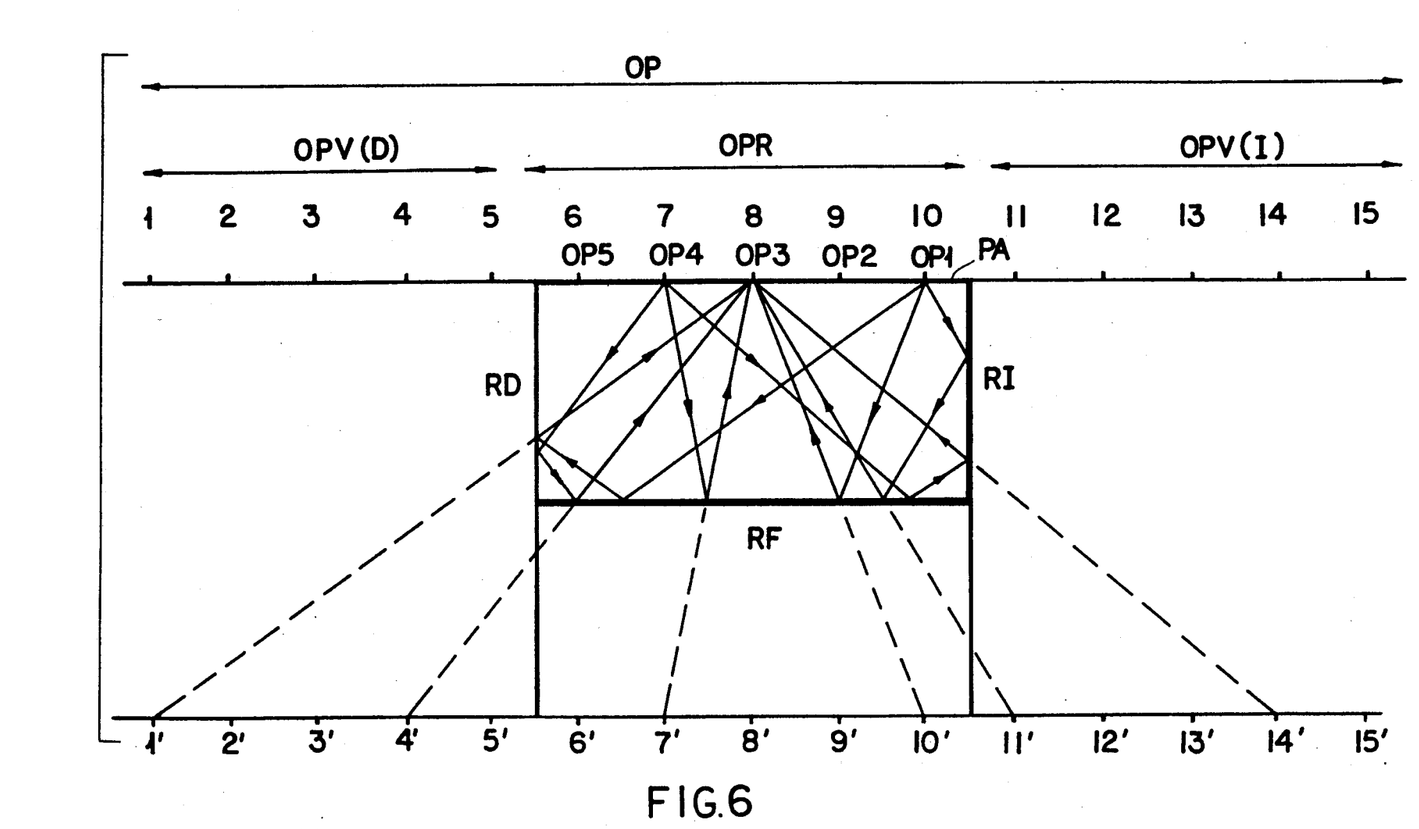
FIG. 6 represents a partial optical diagram of the projecting performing with five projection lenses, according to the invention.

In FIG. 6 is represented in a partial optical diagram the distribution of the various rays projected from the projection lenses OP1, OP3 and OP4, in order to represent each one of the three possible situations of projection devices, that is to say OP1 representing how the extreme lenses are projected; OP4 representing how the intermediate lenses are projected and OP3 representing how the central lens is projected. Facing these projection lenses are situated the three reflectors, from RF and lateral, right RD and left RI. These reflectors project the fifteen pictures 1 to 15 onto the screen PA, fitting the pictures 1-15 taken into one third of the overall distance. With this arrangement, with only five projection lenses the same optical result is achieved as if there were fifteen projection lenses; the real ones OPR corresponding to pictures 6–10; and the virtual ones OPV(D) corresponding to pictures 1 to 5, and OPV(I) corresponding to the left pictures 11–15.

Figure 7:
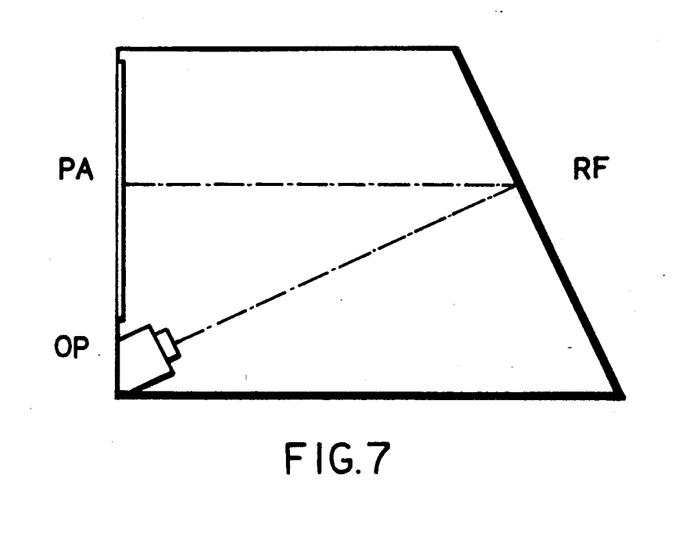
FIG. 7 represents diagrammatically in elevation the arrangement of the parts of the projector system of the present invention.

With FIG. 7 is represented in sectional side view the arrangement of the lenses OP, of the front reflector RF and of the screen PA. It is observed that the transparent screen PA is situated, in the longitudinal direction, in line with the longitudinal arrangement of the lenses OP1 to OP5.

Figure 8:
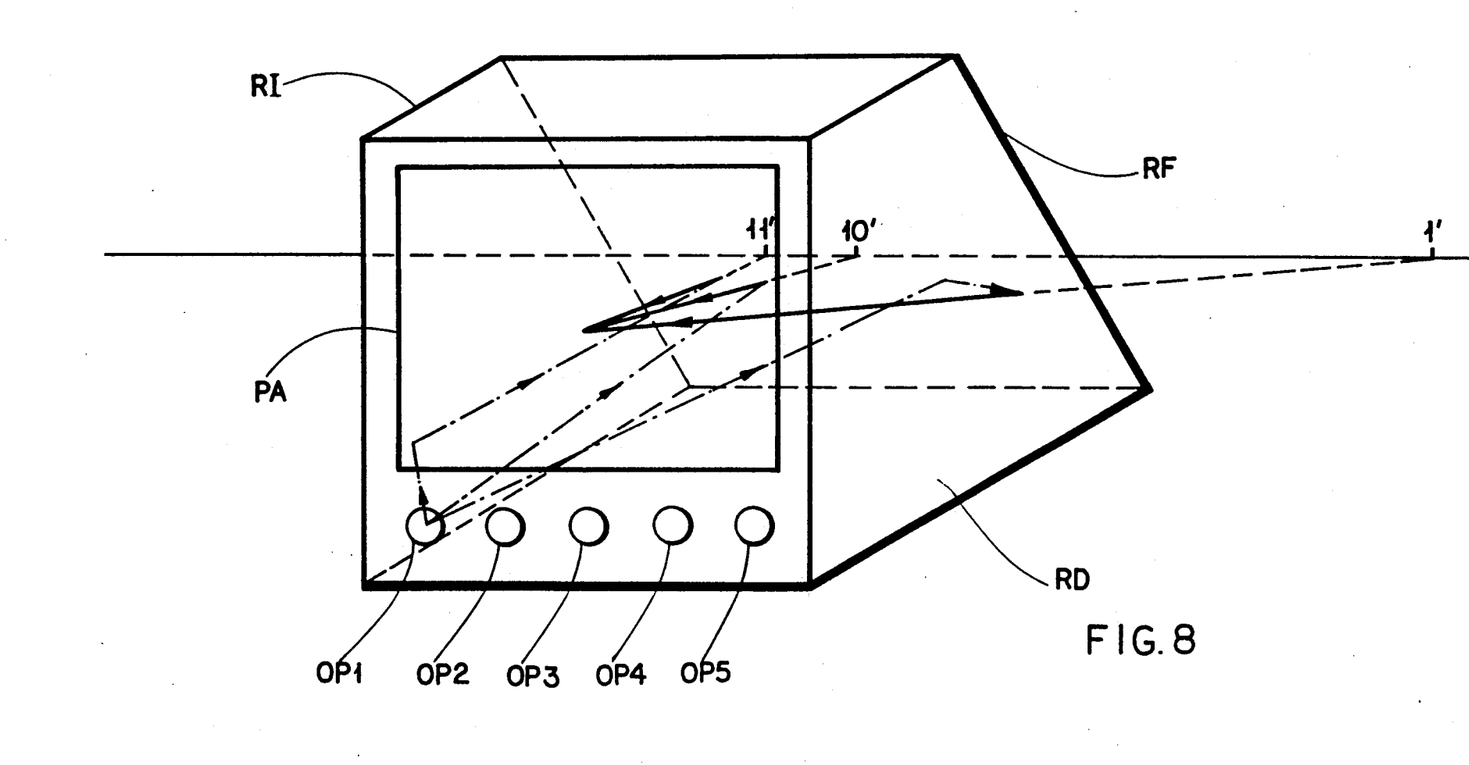
FIG. 8 represents in diagrammatic perspective view a small-sized projection device according to the invention.

Finally, in FIG. 8 is represented a small- or medium-sized projecting device with the arrangement of the various parts. In this figure is represented as an optical diagram the path of the rays coming from the projection lens OP1 which the pictures 1', 10' and 11' project, via the reflectors RI, RF and RD, onto the transparent screen PA.

The preceding explanations should be considered as only a preferred illustrative embodiment. Nevertheless, different values of n (always multiples of 3) could be imagined. The taking, copying and projecting relationships would vary accordingly, in a proportional way, therefore further explanations are omitted. Likewise, other devices equivalent to those explained here could be imagined provided that they fall within the following claims.

I claim:

1. Integrated process for three-dimensional taking, copying and reproducing of still and moving pictures, which consists of the following steps:

a) taking still or moving three-dimensional pictures making use of conventional cameras which expose, on film, slide or video tape, as many two-dimensional pictures as there are cameras, so that, for taking, the n cameras are distributed in 2, 4, 8, etc. groups on a platform; each two camera groups, which cameras are disposed in a common horizontal line in each group, are positioned with mutually perpendicular optical axes, there being interposed between the groups a semitransparent plate which forms 45° with the optical axes of these groups, and a black plate which forms 45° with the semitransparent plate; in the event of there being four camera groups, the latter are divided up into two supergroups, composed of each one of two camera groups with a set of interposed (semitransparent and black) plates in such a way that their resulting optical axes are mutually perpendicular; and another set of (semitransparent and black) plates is interposed between the two supergroups, the optical axes of the individual taking cameras having to remain situated at the centre of each two optical axes of the camera of the opposite group, this relationship being repeated accordingly in the case of the supergroups;

b) in order to copy the n (film, slide or video tape) pictures, arranging the conjugated pictures, that is to say corresponding to the same instantaneous subject, grouped together in trios, in such a way that the left and right pictures are copies in a specularly inverted state with respect to the central picture, each one of the trios being situated at a different projection height, so that, when the copying is done, the n pictures remain on a single film, the trios being offset by a distance equal to that which must exist between optical axes of adjacent projection lenses; and c) carrying out the projection using n/3 projection lenses, that is to say as many lenses as picture trios, and adjusting the projection lenses in such a way that the central picture of the film or equivalent is reproduced directly onto the reproduction screen or via one or several front reflections or by one or several reflecting mirrors situated in front of the lenses, the lateral pictures being projected via an additional left reflection or via an additional right reflection, using systems of side mirrors, and each one of the n/3 projection lenses being situated with a height offset with respect to the adjacent projection lenses which is equal to the height distance which exists between the picture trios of the film.

* * * * *

UNITED STATES PATENT AND TRADEMARK OFFICE
CERTIFICATE OF CORRECTION

PATENT NO. : 5,237,353
DATED : August 17, 1993
INVENTOR(S) : Juan DOMINGUEZ MONTES It is certified that error appears in the above-identified patent and that said Letters Patent is hereby corrected as shown below:

On title page, left column, item 76, after "Juan", "D." should be --Dominguez--.

Signed and Sealed this

Twenty-sixth Day of April, 1994

Attest:

BRUCE LEHMAN

Attesting Officer

Commissioner of Patents and Trademarks